US011763625B2

(12) United States Patent
Kim

(10) Patent No.: US 11,763,625 B2
(45) Date of Patent: *Sep. 19, 2023

(54) METHOD OF GAMING, A GAMING SYSTEM AND A GAME CONTROLLER

(71) Applicant: Aristocrat Technologies Australia Pty Limited, North Ryde (AU)

(72) Inventor: Hyong Joo Kim, Meadowbank (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 205 days.

This patent is subject to a terminal disclaimer.

(21) Appl. No.: 17/084,227

(22) Filed: Oct. 29, 2020

(65) Prior Publication Data

US 2021/0049862 A1 Feb. 18, 2021

Related U.S. Application Data

(63) Continuation of application No. 15/287,993, filed on Oct. 7, 2016, now Pat. No. 10,839,637, which is a (Continued)

(30) Foreign Application Priority Data

Jan. 8, 2008 (AU) ................................ 2008900085

(51) Int. Cl.

*A63F 13/00* (2014.01)
*G07F 17/32* (2006.01)
*G07F 17/34* (2006.01)

(52) U.S. Cl.

CPC ...... *G07F 17/3213* (2013.01); *G07F 17/3244* (2013.01); *G07F 17/3262* (2013.01); *G07F 17/34* (2013.01)

(58) Field of Classification Search

CPC ............................ G07F 17/3213; G07F 17/34
See application file for complete search history.

(56) References Cited

U.S. PATENT DOCUMENTS 7,195,559 B2 3/2007 Gilmore
2002/0025846 A1 2/2002 Bennett
(Continued)

FOREIGN PATENT DOCUMENTS

AU 2007231804 5/2008
CA 2533855 10/2000
(Continued)

OTHER PUBLICATIONS

Office Action dated Mar. 20, 2020, for U.S. Appl. No. 15/287,993 (pp. 1-8).
(Continued)

*Primary Examiner* — David L Lewis
*Assistant Examiner* — Eric M Thomas
(74) *Attorney, Agent, or Firm* — McAndrews, Held & Malloy, Ltd.

(57) ABSTRACT

A method of gaming comprising: selecting, in each whole reel symbol game round, symbols for display to a player in a set of display positions, subsets of the display positions corresponding to respective ones of a plurality of reels set side by side, by: selecting a whole reel symbol from a whole reel symbol set for at least one of the reels, such that the whole reel symbol is at all display positions of the at least one reel, and, selecting symbols for each of the other reels from respective ones of a plurality of reel symbol sets, each reel symbol set comprised of a plurality of different symbols; and determining an outcome for each game round based on the selected symbols.

20 Claims, 9 Drawing Sheets

Related U.S. Application Data continuation of application No. 14/065,115, filed on Oct. 28, 2013, now abandoned, which is a continuation of application No. 12/350,748, filed on Jan. 8, 2009, now Pat. No. 8,585,488.

(56) References Cited

U.S. PATENT DOCUMENTS

| | | | | |
|---|---|---|---|---|
| 2002/0094857 | A1 | 7/2002 | Meyer | |
| 2003/0064778 | A1* | 4/2003 | Berman | G07F 17/3211 463/20 |
| 2004/0063488 | A1* | 4/2004 | Berman | G07F 17/3211 463/20 |
| 2004/0198489 | A1 | 10/2004 | Kaminkow | |
| 2005/0070354 | A1 | 3/2005 | Baerlocher | |
| 2005/0119043 | A1* | 6/2005 | Berman | G07F 17/3211 463/20 |
| 2005/0130737 | A1 | 6/2005 | Englman | |
| 2005/0233796 | A1 | 10/2005 | Baerlocher | |
| 2005/0233801 | A1 | 10/2005 | Baerlocher | |
| 2006/0030390 | A1 | 2/2006 | Okada | |
| 2006/0183532 | A1 | 8/2006 | Jackson | |
| 2006/0252488 | A1 | 11/2006 | Lalonde | |
| 2006/0287060 | A1 | 12/2006 | Yoshimi | |
| 2007/0010316 | A1 | 1/2007 | Baerlocher | |
| 2007/0021182 | A1 | 1/2007 | Gauselmann | |
| 2007/0060261 | A1 | 3/2007 | Gomez | |
| 2007/0149268 | A1 | 6/2007 | Gauselmann | |
| 2007/0155474 | A1 | 7/2007 | Gauselmann | |
| 2007/0232382 | A1 | 10/2007 | Berman | |
| 2008/0051172 | A1 | 2/2008 | Okada | |
| 2008/0108411 | A1 | 5/2008 | Jensen | |

FOREIGN PATENT DOCUMENTS

| | | |
|---|---|---|
| DE | 1436171 | 4/1996 |
| DE | 19520310 | 12/1996 |
| EP | 1473681 | 11/2004 |
| EP | 1544811 | 6/2005 |
| EP | 1811477 | 7/2007 |
| GB | 1292712 | 10/1972 |
| GB | 1471866 | 4/1977 |
| GB | 2042782 | 9/1980 |
| GB | 2405737 | 3/2005 |
| GB | 2429657 | 3/2007 |
| WO | 9303464 | 2/1993 |
| WO | 0020082 | 4/2000 |
| WO | 2004060512 | 7/2004 |
| WO | 2006023327 | 3/2006 |
| WO | 2007032914 | 3/2007 |
| WO | 2007032931 | 3/2007 |
| WO | 2007081310 | 7/2007 |
| WO | 2007084766 | 7/2007 |

OTHER PUBLICATIONS

Notice of Allowance dated Jul. 14, 2020 for U.S. Appl. No. 15/287,993 (pp. 1-7).

* cited by examiner

METHOD OF GAMING, A GAMING SYSTEM AND A GAME CONTROLLER

RELATED APPLICATIONS

The present application is a continuation, and claims priority to, U.S. patent application Ser. No. 15/287,993, having a filing date of Oct. 7, 2016, which is a continuation and claims priority to co-pending U.S. patent application Ser. No. 14/065,115, having a filing date of Oct. 28, 2013, which is a continuation and claims priority to U.S. patent application Ser. No. 12/350,748, having a filing date of Jan. 8, 2009, now U.S. Pat. No. 8,585,488, which claims priority to Australian Provisional Patent Application No. 2008900085, having a filing date of Jan. 8, 2008. The above-identified applications are hereby incorporated herein by reference in their entirety.

FIELD OF THE INVENTION

The present invention relates to a method of gaming, a gaming system and a game controller.

BACKGROUND

Gaming systems are known comprising a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine with selected symbols are displayed in virtual reels on a video display.

"Sticky WILD" is a known feature where a WILD symbol, which can substitute for any symbol in determining a win, sticks in the visible reel position where it first appears for subsequent spins, until the feature ends. Another feature is also known to add another reel of WILD symbols at the end of each reel during a free game.

While such features provide users with enjoyment, there is a need for alternative gaming systems with different special features to add to player excitement.

BRIEF SUMMARY

According to a first aspect of the invention there is provided a method of gaming comprising: selecting, in each whole reel symbol game round, symbols for display to a player in a set of display positions, subsets of the display positions corresponding to respective ones of a plurality of reels set side by side, by: selecting a whole reel symbol from a whole reel symbol set for at least one of the reels, such that the whole reel symbol is at all display positions of the at least one reel, and, selecting symbols for each of the other reels from respective ones of a plurality of reel symbol sets, each reel symbol set comprised of a plurality of different symbols; and determining an outcome for each game round based on the selected symbols.

In an embodiment, the method further comprises selecting the at least one reel to be composed of the whole reel symbol.

In an embodiment, the whole reel symbol game round is a current one of a series of successive game rounds for which a whole reel symbol is selected.

In an embodiment, the step of selecting a whole reel symbol in the current game round is for a game round following a preceding game round of the series, the method includes selecting a whole reel symbol independently of the preceding round and the step of selecting the at least one reel includes selecting a reel independently of the preceding round.

In an embodiment, more than one of the reels is composed of the whole reel symbol in the whole reel symbol game round.

In an embodiment, the selection of the reel to be composed of the whole reel symbol is random.

In an embodiment, selection of the whole reel symbol is random.

In an embodiment, the method further comprises the step of displaying the whole reel symbol in a whole reel symbol window.

In an embodiment, the step of displaying the whole reel symbol in the whole reel symbol window occurs before the reel composed of the whole reel symbol is displayed.

In an embodiment, the display of the whole reel symbol at the display positions of the at least one reel to be composed of the whole reel symbol occurs before the display of the symbols selected for the other reels.

According to a second aspect of the invention there is provided a gaming system comprising: a display for symbols to be displayed in a set of display positions to a player; a symbol selector for selecting, in each whole reel symbol game round, symbols for display to a player in a set of display positions, subsets of the display positions corresponding to respective ones of a plurality of reels set side by side, the symbol selector further comprising: a whole reel symbol selector for selecting a whole reel symbol from a whole reel symbol set for at least one of the reels, such that the whole reel symbol is at all display positions of the at least one reel, and, a reel symbol selector for selecting symbols for each of the other reels from respective ones of a plurality of reel symbol sets, each reel symbol set comprised of a plurality of different symbols; and an outcome evaluator arranged to determine an outcome for each game round based on the selected symbols.

In an embodiment, the gaming system further comprises a reel selector for selecting the at least one reel to be composed of the whole reel symbol.

In an embodiment, the whole reel symbol game round is a current one of a series of successive game rounds for which a whole reel symbol is selected.

In an embodiment, when the whole reel game round follows a preceding game round, the whole reel symbol selector is arranged to select a whole reel symbol independently of the preceding round and reel selector is arranged to select the at least one reel independently of the preceding round.

In an embodiment, more than one of the reels is composed of the whole reel symbol in the whole reel symbol game round.

In an embodiment, the reel selector is arranged to select randomly.

In an embodiment, the symbol selector is arranged to select randomly.

In an embodiment, the display is arranged to display the whole reel symbol in a whole reel symbol window.

In an embodiment, the display is arranged to display the whole reel symbol in the whole reel symbol window before display of the reel composed of the whole reel symbol.

In an embodiment, the display is arranged to display the display positions of the at least one reel composed of the whole reel symbol before display of the symbols selected for the other reels.

According to a third aspect of the invention there is provided a game controller arranged to: select, in each whole reel symbol game round, symbols for display to a player in a set of display positions, subsets of the display positions corresponding to respective ones of a plurality of reels set side by side, by: select a whole reel symbol from a whole reel symbol set for at least one of the reels, such that the whole reel symbol is at all display positions of the at least one reel, and, select symbols for each of the other reels from respective ones of a plurality of reel symbol sets, each reel symbol set comprised of a plurality of different symbols; and determine an outcome for each game round based on the selected symbols.

In an embodiment, the game controller is further arranged to select the at least one reel to be composed of the whole reel symbol.

In an embodiment, the whole reel symbol game round is a current one of a series of successive game rounds for which a whole reel symbol is selected.

In an embodiment, the current game round is a game round following a preceding game round of the series, the game controller is arranged to select a whole reel symbol independently of the preceding round and select a reel independently of the preceding round.

In an embodiment, there is more than one of the reels to be composed of the whole reel symbol in the whole reel symbol game round.

In an embodiment, the selection of the reel to be composed of the whole reel symbol is random.

In an embodiment, selection of the whole reel symbol is random.

In an embodiment, the game controller is arranged to control display of the whole reel symbol to be in a whole reel symbol window.

In an embodiment, the game controller is arranged to control display on of the whole reel symbol in the whole reel symbol window to occur before display of the reel composed of the whole reel symbol.

In an embodiment, the game controller is arranged to control display of the reel composed of the whole reel symbol to occur before display of the symbols selected for the other reels.

In an embodiment, the game controller is implemented by a processor executing program code stored in a memory.

According to a fourth aspect of the invention there is provided computer program code when executed by a computer causes the computer to implement any of the embodiments of the method of gaming of the first aspect of the invention.

According to a fifth aspect of the invention there is provided a computer readable medium comprising the program code of the fourth aspect of the invention.

According to a sixth aspect of the invention there is provided a data signal comprising the computer program code of the fourth aspect of the invention.

According to seventh aspect, the invention extends to transmitting the program cod of the fourth aspect.

BRIEF DESCRIPTION OF THE DRAWINGS

Embodiments of the invention are described by way of example in conjunction with the following drawings, in which.

DETAILED DESCRIPTION

Figure 1:
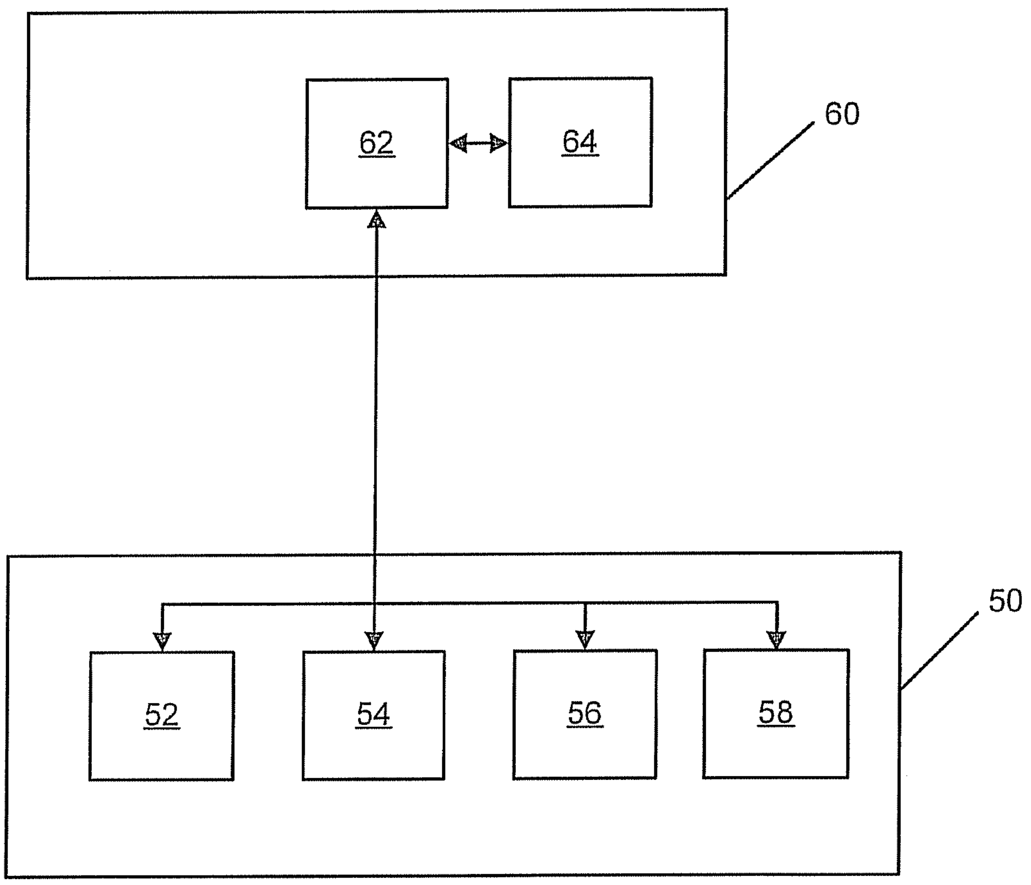
FIG. 1 is a block diagram of the core components of a gaming system.

Referring to the drawings, there is shown a gaming system having a game controller arranged to implement a game wherein a "whole reel symbol" is selected and appears on the display causing at least one of the reels to show the whole reel symbol in all visible reel positions.

The gaming system may take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired.

Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
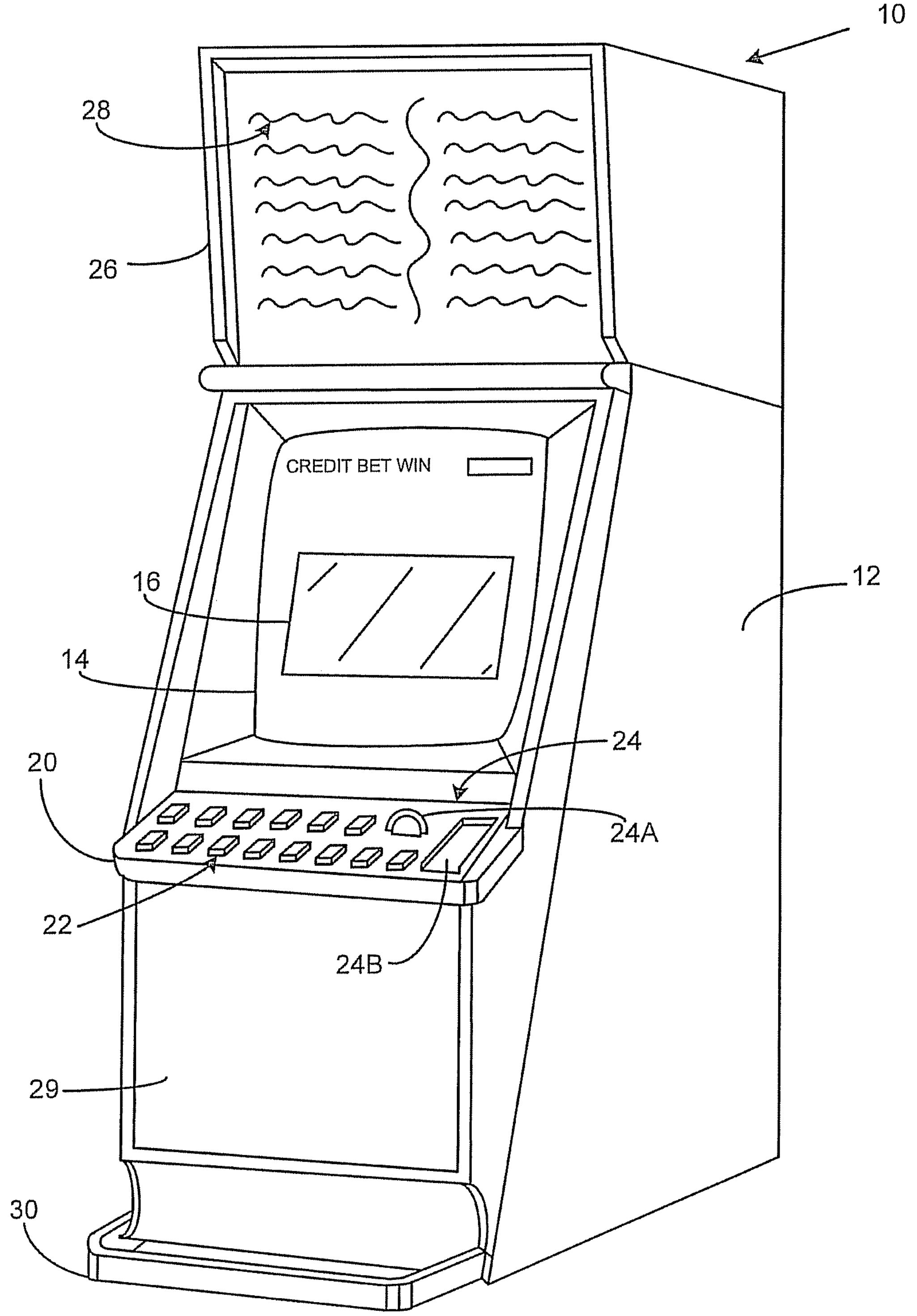
FIG. 2 is a perspective view of a standalone gaming machine.

A gaming system in the form of a standalone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
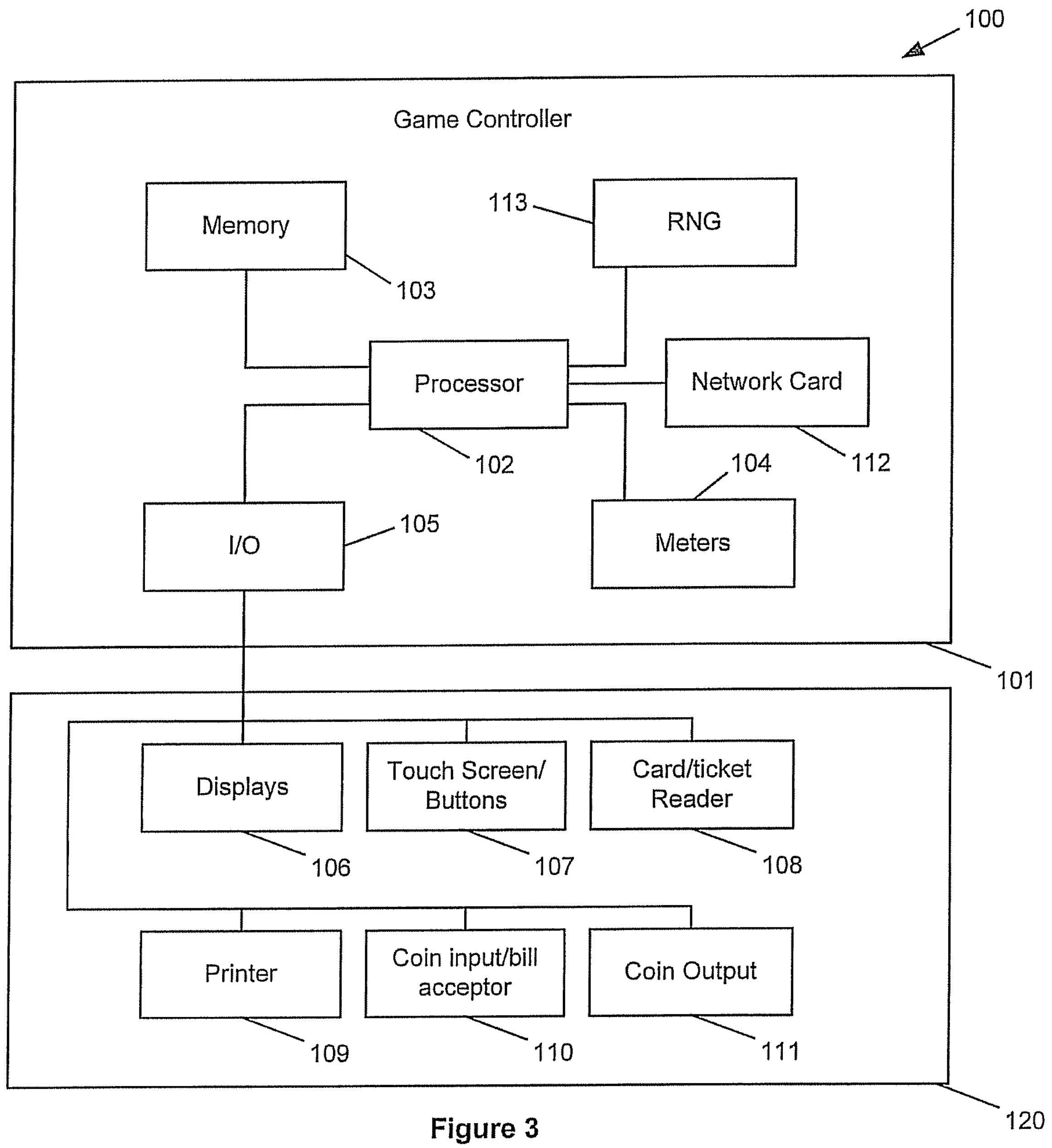
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
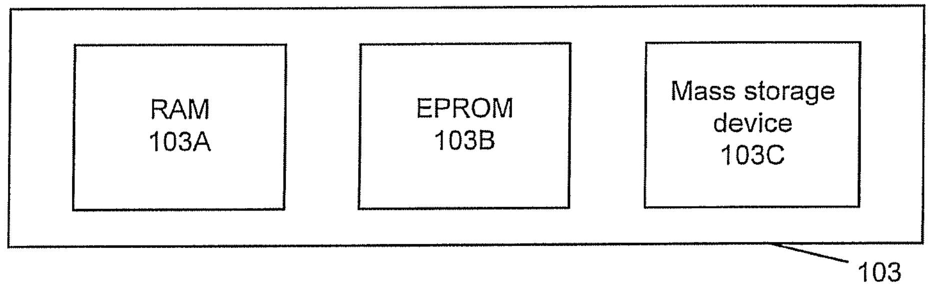
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
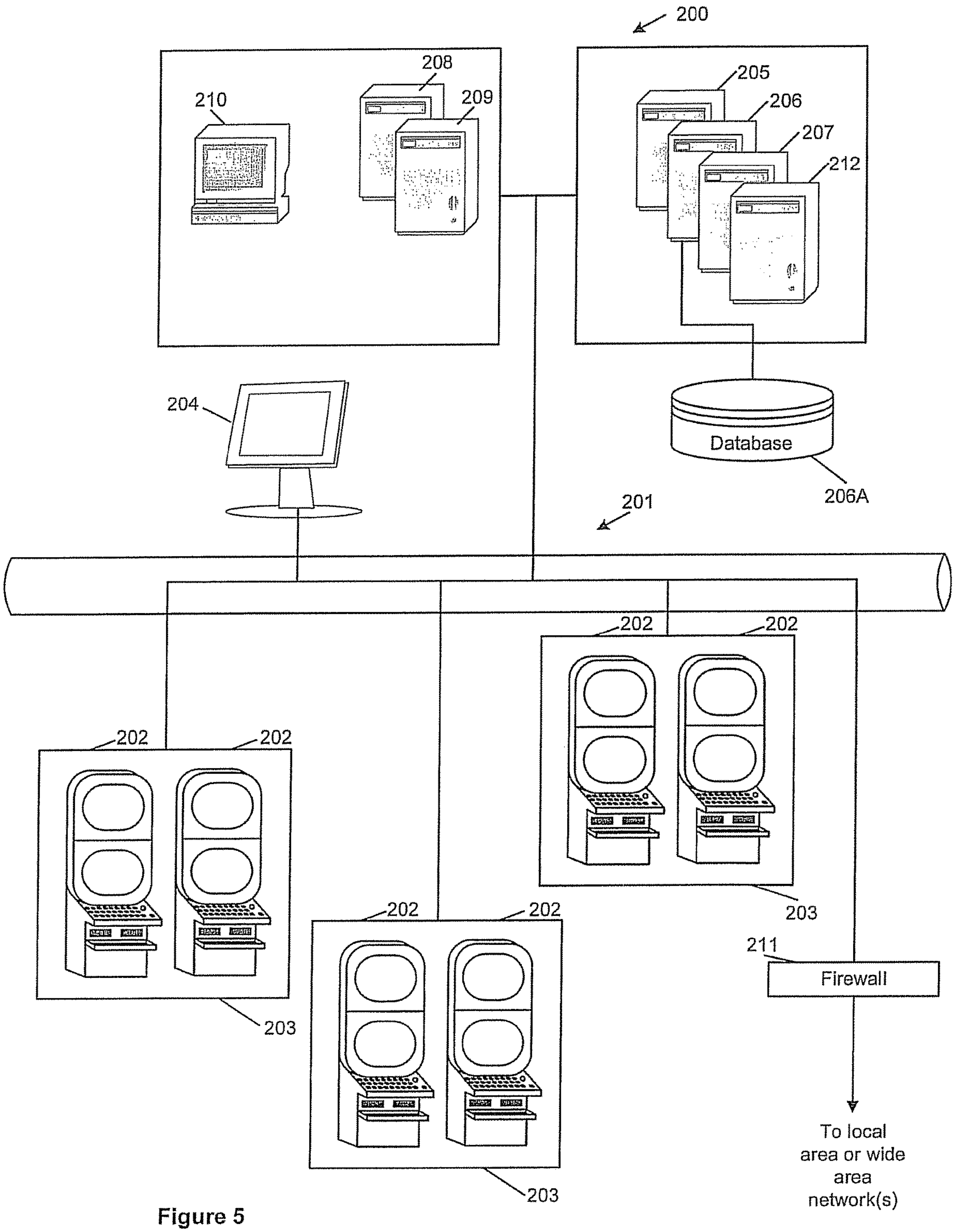
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

Embodiments of the invention relate to gaming systems for implementing games that involve a display of spinning reels as part of the display of the outcome of the game.

The game controllers of such gaming systems have a stop determining function that determines the stop position for each reel. For example, if there are five reels, each having twenty symbols, the stop determining function might determine that the stop positions are positions: 3, 13, 7, 9, and 17. The spinning of the reels is then controlled so that each symbol comes to a stop in the same row, typically a predetermined row in a "window" corresponding to a "single win line" game. When a reels stops, the symbols will be in one of a plurality of possible symbol positions for that reel relative to the stop position.

Exemplary embodiments of the present invention relate to gaming systems that allow a player to select how many win lines of a plurality of win lines they will play in each game—i.e. a minimum of one win line up to the maximum number of win lines allowed by the game. Each win line is formed by a set of symbol positions consisting of one symbol position from each reel. That is, a predetermined symbol position of each reel is assigned to a win line. The symbol positions that constitute each of the win lines are usually advertised to the player by markings on the display or diagrams showing the symbol positions that correspond to each win line. The win lines may incorporate for example, horizontal or diagonal lines.

In other embodiments, the player may place a wager differently, for example, by selecting a number of reels to play such that the player selects a number of ways to win based on the active display positions of each reel—each display position being active for a selected reel and only one display position being active for other reels.

Figure 6:
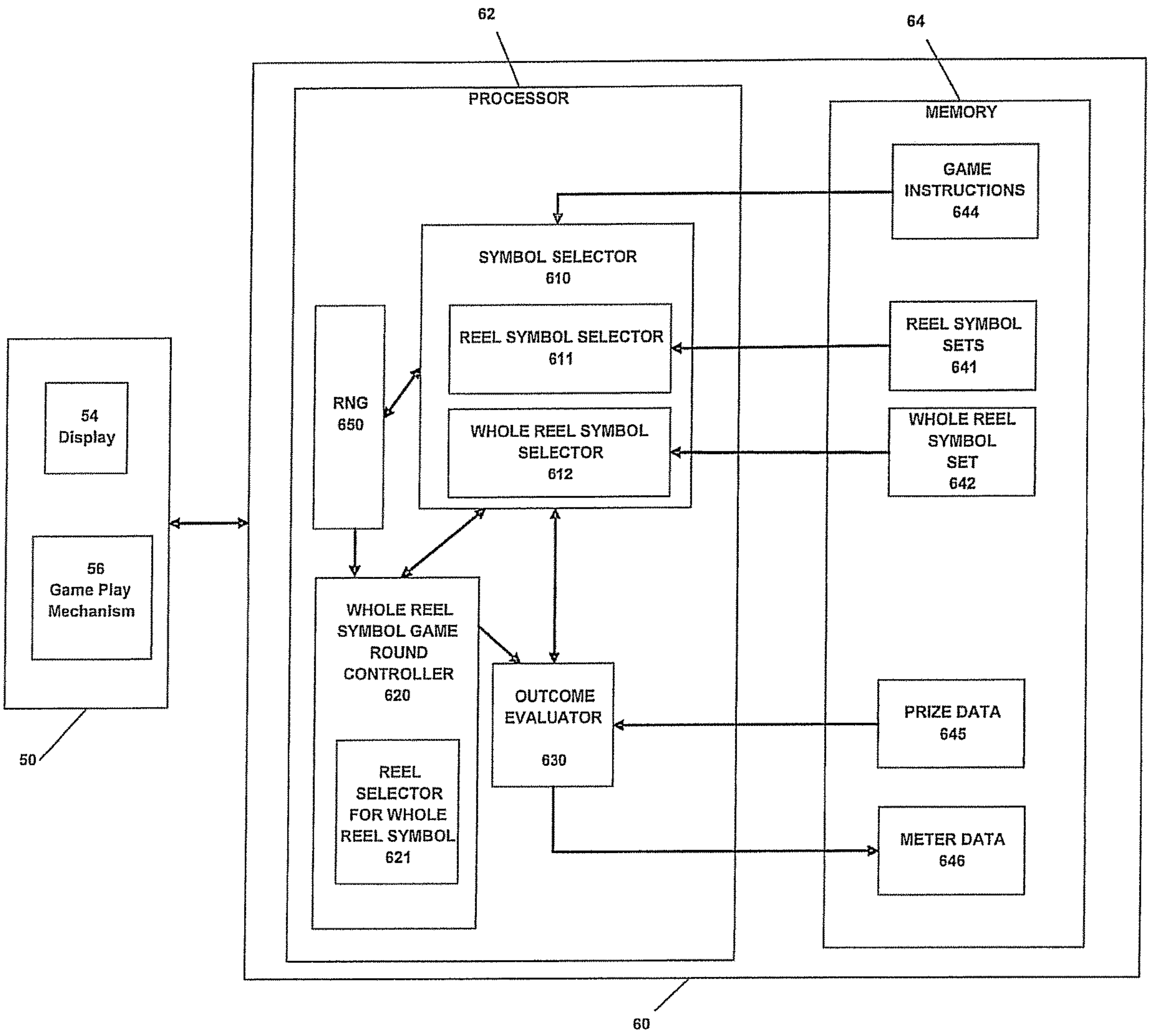
FIG. 6 is a further block diagram of the gaming system.

The game controller of one embodiment is shown in more detail in FIG. 6. The game controller 60 incorporates a processor 62 which implements a symbol selector 610 comprising reel symbol selector 611 and whole reel symbol selector 612, random number generator 650, whole reel symbol game round controller 620 comprising a reel selector 621 to select the reel to be composed of the whole reel symbol and outcome evaluator 630 based on program code stored in memory 64. Memory 64 comprises game instructions 644, reel symbol sets 641, whole reel symbol set 642, prize data 645 and meter data 646. Persons skilled in the art will appreciate that one or more of these components of the game controller could be provided in other ways, for example by a dedicated circuit.

Symbol selector 610 selects symbols from either whole reel symbol set 642 for the whole reel symbol to compose the whole of the at least one reel, or from reel symbol sets 641 to occupy the other reels, using random numbers from random number generator 650, to appear at display positions on the display 54. For example, in the case of the other reels that are not to be composed of the whole reel symbol this may be done by selecting stop positions for a plurality of reels defined by the reel symbol sets. Symbol selector 610 works in cooperation with whole reel symbol controller 620 which controls the appearance, location and overriding effect of the whole reel symbol in a whole reel symbol game round, including specifying via reel selector 621 which reel will be composed of the whole reel symbol. In one embodiment the initiation of the whole reel symbol game round may be determined either by player choice input from game play mechanism 56, by a random event obtained from random number generator 650, or by a previous game round outcome such as a special prize determined by outcome evaluator 630, or by other techniques known in the art for initiating a different element of game play.

The outcome evaluator 630 calculates any prize associated with the current game round depending on game instructions 644 and prize data 645. The outcome evaluator then updates meter data 645, and displays any win on display 54 on the player interface 50.

Figure 7:
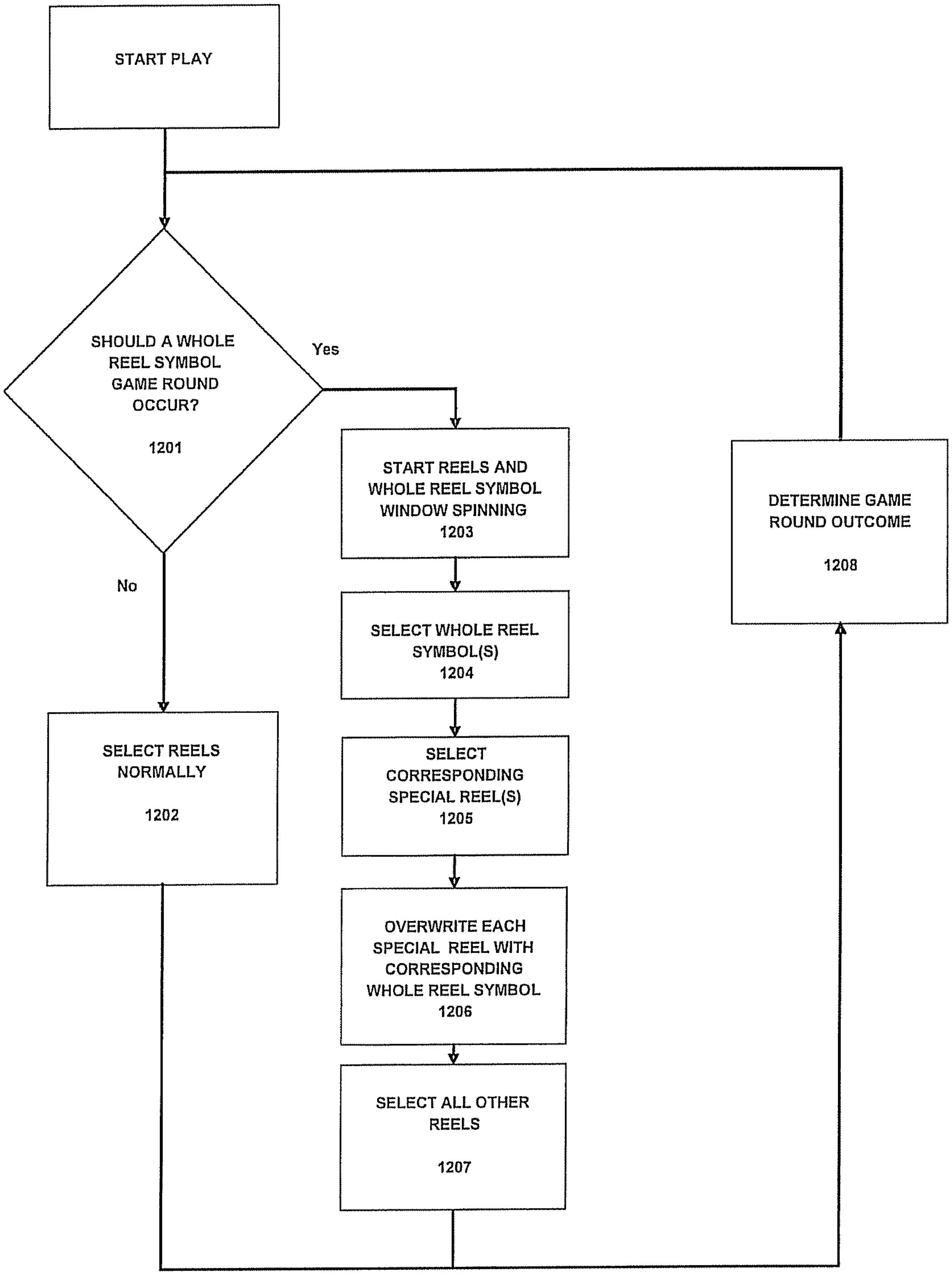
FIG. 7 shows a flow diagram for the method of an embodiment of the invention.

Now referring to FIG. 7, a flow diagram for an embodiment of the invention is shown. The step of determining whether the whole reel symbol game round should occur 1201 is first performed by the whole reel symbol game round controller 620, with input from player choice, random event or previous win combination.

If the answer is "no", in step 1202 the symbol selector 610 selects the symbols to display in the reel positions normally from reel symbol sets 641, shown on the display 54 by the reels spinning in their visible reel positions and stopping with the selected symbols.

If the answer is "yes", in step 1203 the whole reel symbol game round controller 620 commands symbol selector 610 to start the selection process of all the spinnable reels and whole reel symbol window, as shown on the display 54 by a simulated spinning action in the visible reel positions and the whole reel symbol window. In step 1204 whole reel symbol game round controller 620 commands symbol selector 610 to select the whole reel symbol from whole reel symbol set 642 (or possibly the first of a set if there is to be more than one reel to be composed of the whole reel symbol, or indeed if two reels are to be composed of independently selected whole reel symbols) and display on the display 54 by the appearance of the selected whole reel symbol in a whole reel symbol window. In step 1205 whole reel symbol game round controller 620 via the reel selector 621 determines and commands symbol selector 610 which reel or reels shall be composed of the whole reel symbol. This may be determined on the basis of player choice through game play mechanism 56, random event through random number generator 650 or a previous winning outcome determined by outcome evaluator 630. It will be appreciated that selecting the whole reel symbol first provides an advantageous sense of anticipation.

In one embodiment, if the whole reel symbol game round is a current one of a series, the reels composed of the whole reel symbol from the previous game round may be retained with their whole reel symbols, and an additional reel may be chosen for the current round to be composed of an independently selected current whole reel symbol, which may or may not be the same as the preceding whole reel symbol. In another embodiment, the reels composed of the whole reel symbols from the previous game round may be reset. In step 1206 the whole reel symbol game round controller 620 commands the symbol selector 610 to select symbols for the special reels with the whole reel symbol in all visible reel positions. In step 1207 the symbol selector 610 is cleared to select symbols normally for all the other reels.

In step 1208 outcome evaluator 630 determines the game round outcome from prize data 645.

EXAMPLE 1

Figure 8A:
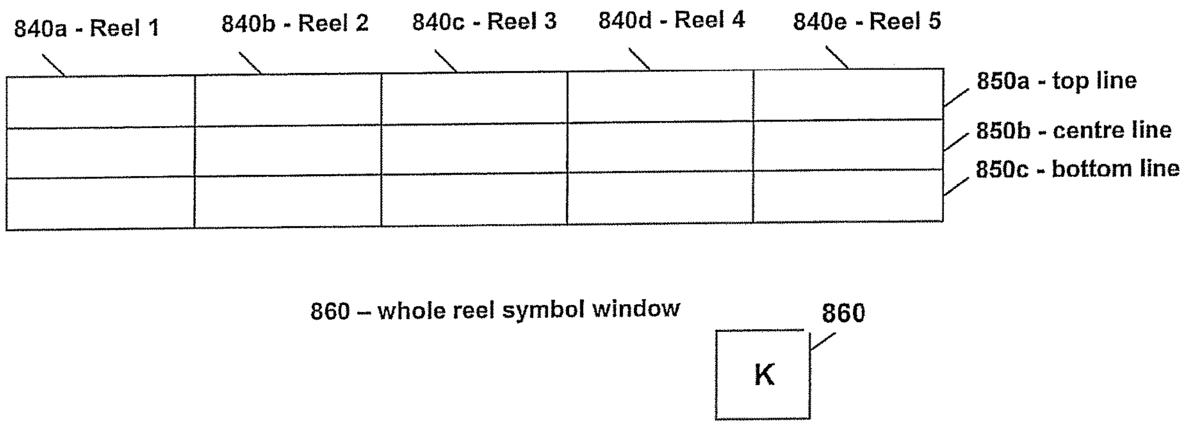
FIGS. 8A, 8B and 8C show the displays of Example 1.
Figure 8B:
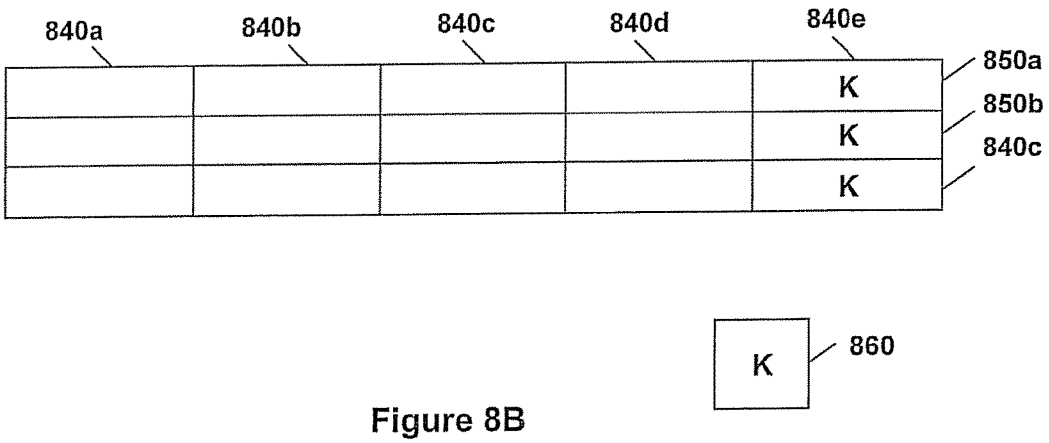
Figure 8C:
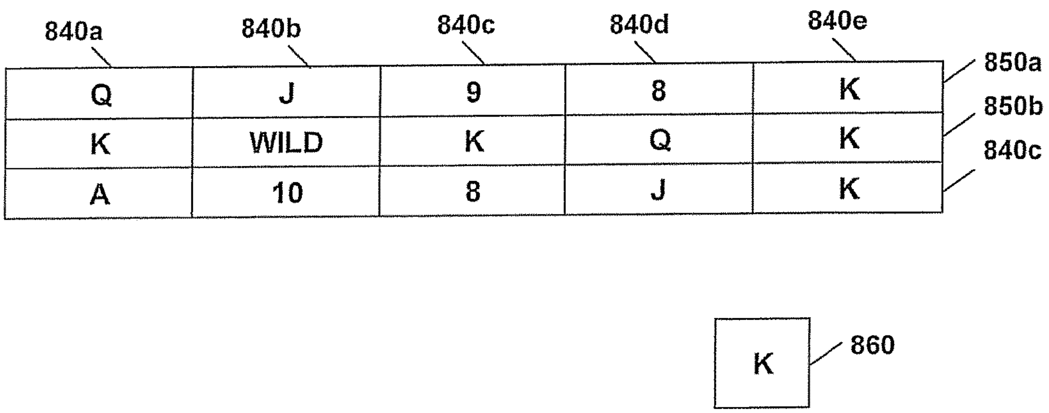

Now referring to FIGS. 8A, 8B and 8C, an example of one embodiment of the method of the invention is shown. In FIG. 8A a reel part of the display is divided into 5 reels 840*a* to 840*e* numbered 1 to 5 from left to right each displaying 3 symbols in a vertical visible reel window, arranged into top line 850*a*, center line 850*b* and bottom line 850*c* such that there are 15 display positions in total. Triggered by particular winning combination of a previous game round, the whole reel symbol game round controller has determined that a whole reel symbol game round will occur. A whole reel symbol window 860 appears outside the reel part of the display with room to show the whole reel symbol. In the figure, the whole reel symbol has by now been selected and is shown in the whole reel symbol window 860 as a "King". The reels are still spinning, shown in the figure as blank. Which reel will be composed of the whole reel symbol has not yet been determined.

FIG. 8B shows the display some time later, when the whole reel symbol game round controller 620 has determined using a random number from random number generator 650 that reel number 5 shall be the special reel, and the whole reel symbol "King" is displayed in all visible reel positions of reel number 5.

FIG. 8C shows the display a further time later, when the other reels have stopped spinning. The prize is evaluated by outcome evaluator 630. The win line in this example was the default center line. Outcome evaluator 630 awards a prize for 4 Kings on the center line, using the WILD symbol as a substitute for a King, calculating the prize using prize data 645 and updates meter data 646.

EXAMPLE 2

Figure 9A:
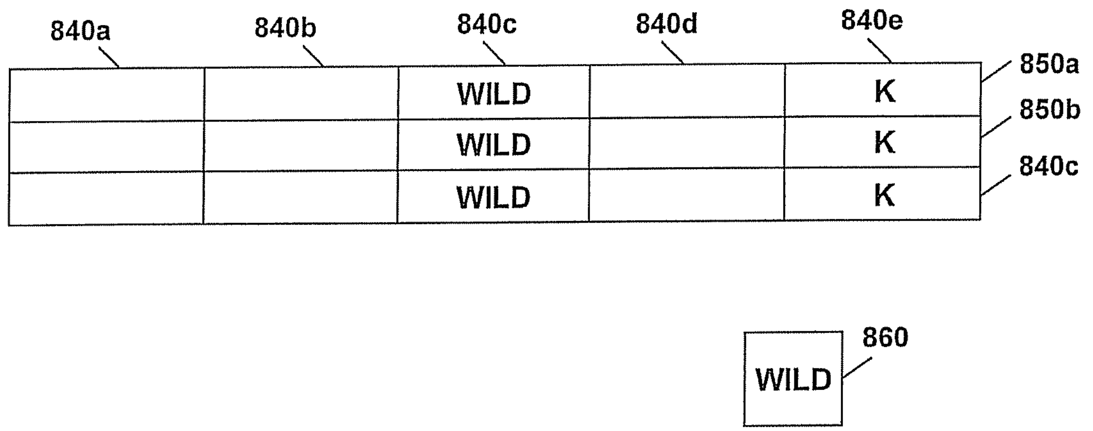
FIGS. 9A and 9B shows displays of Example 2.
Figure 9B:
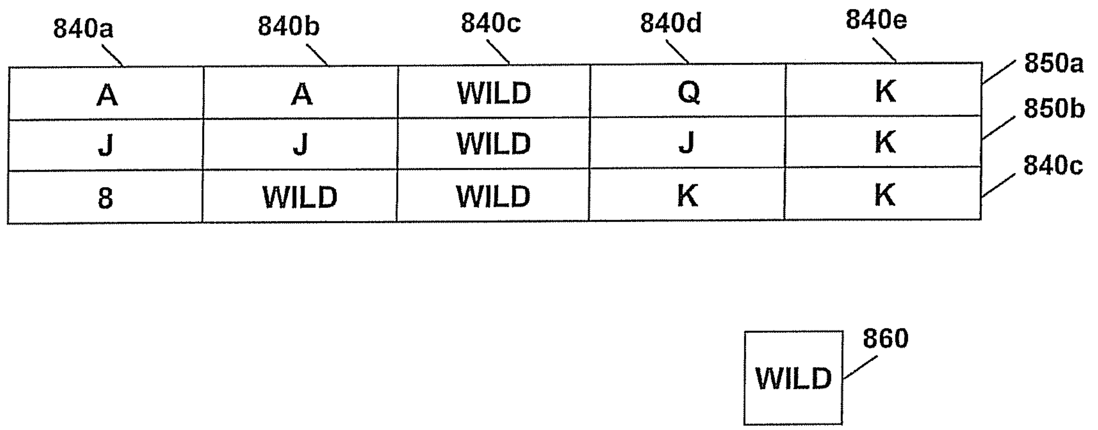

Now referring to FIGS. 9A and 9B, an example of another embodiment is shown as a following game round from the game round of example 1. In this embodiment, the whole reel symbol game round controller 620 has determined that more than one whole reel symbol game round shall occur, and has also determined that in the current game round the preceding reel number 5 will be frozen with its Kings intact, an additional reel will be chosen to be composed of a new current whole reel symbol. This embodiment compounds the excitement in the current game round as the winning probabilities are further increased.

FIG. 9A shows the situation after the symbol selector has selected the current whole reel symbol as a WILD, shown in the whole reel symbol window, and has selected the WILD to appear on all the visible reel positions of reel number 3 under command of the whole reel symbol game round controller 620. Reel numbers 1, 2, and 4 are still spinning.

FIG. 9B shows the situation some time later, after the selected symbols for the remaining reels have spun to a stop.

Outcome evaluator 630 awards a prize for 4 Jacks on the center line, using the WILD symbol as a substitute for a Jack, calculating the prize using prize data 645 and updates meter data 646. If there was a bottom win line also, outcome evaluator would also award a prize for four Kings on the bottom line.

EXAMPLE 3

Figure 10:
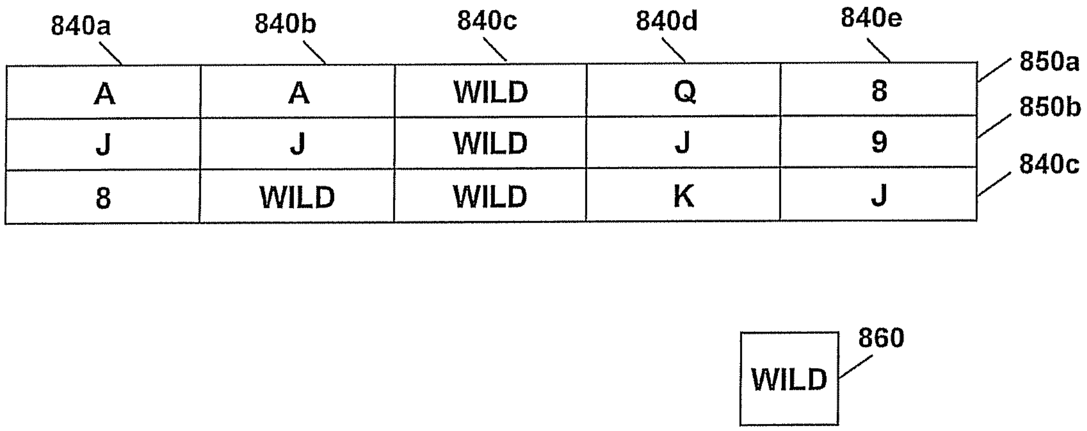
FIG. 10 shows a display of Example 3.

Now referring to FIG. 10, an example of another embodiment is shown as a variant of the following game round from the game round of example 2. In this embodiment, the whole reel symbol game round controller 620 has determined that more than one whole reel symbol game round shall occur, and has also determined that in the current game round the preceding reel number 5 will be reset and spun with the other reels. The reel number 5 may or may not be selected as the current reel to be composed of the current whole reel symbol.

FIG. 10 shows the final display after the symbol selector has selected the current whole reel symbol as a WILD, shown in the whole reel symbol window, has selected the WILD to appear on all the visible reel positions of reel number 3 under command of the whole reel symbol game round controller 620, and after symbol selector 610 has selected symbols for the remaining reels 1, 2, 4, and 5.

Outcome evaluator 630 awards a prize for 4 Jacks on the center line, using the WILD symbol as a substitute for a Jack, calculating the prize using prize data 645 and updates meter data 646.

It will be appreciated as emphasized herein that the invention is not restricted to a particular number of possible special reels or possible corresponding whole reel symbols, provided there is more than one whole reel symbol available to select, or a particular number of whole reel symbol game rounds. It will also be appreciated that the whole reel symbol set can intersect with, be a subset of, or be the same as, the reel symbol sets.

Persons skilled in the art will appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

Persons skilled in the art will also appreciate that many variations may be made to the invention without departing from the scope of the invention. In particular, that features described above may be combined to form further embodiments.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming machine providing a series of whole reel symbol game rounds, the gaming machine comprising:

a display device being caused to display i) a plurality of reels, each of the plurality of reels having a plurality of display positions, and ii) a whole reel symbol window outside of the plurality of reels;

a player-interface operable to initiate a current round in the series of whole reel symbol game rounds; and a controller having a processor and a memory, the memory storing a plurality of instructions, which, when executed in the current round in the series of whole reel symbol game rounds, cause at least:

control the display device to display a current whole reel symbol in the whole reel symbol window, control the display device to display i) a different whole reel symbol being reset at the plurality of display positions on a first reel from a previous round in the series of whole reel symbol game rounds with the current whole reel symbol, and ii) the plurality of reels, less the first reel, being spun, to display a plurality of symbols in the plurality of display positions randomly selected based on a random number generated by a random number generator, and control the display device to display an outcome for the current round in the series of whole reel symbol game rounds based on the plurality of symbols displayed.

2. The gaming machine of claim 1, wherein the instructions, when executed, further cause the processor to randomly select the first reel to be composed of the current whole reel symbol.

3. The gaming machine of claim 1, wherein the instructions, when executed, further cause the display to present the current whole reel symbol at the plurality of display positions in the first reel in a subsequent round of the series of whole reel symbol game rounds.

4. The gaming machine of claim 1, wherein the instructions, when executed, further cause the processor to randomly select the current whole reel symbol independently of the previous round of the series of whole reel symbol game rounds.

5. The gaming machine of claim 1, wherein the instructions, when executed, further cause the display to present the current whole reel symbol in the plurality of display positions in a second reel of the plurality of reels.

6. The gaming machine of claim 5, wherein the instructions, when executed, further cause the processor to randomly select the second reel to be composed of the current whole reel symbol.

7. The gaming machine of claim 5, wherein the instructions, when executed, further cause the processor to cause the display to present the current whole reel symbol prior to presenting the plurality of symbols in the plurality of reels less the first reel and the second reel.

8. The gaming machine of claim 1, wherein the instructions, when executed, further cause the processor to cause the display to present the current whole reel symbol in the plurality of display positions in the first reel before the plurality of reels less the first reel stop spinning.

9. The gaming machine of claim 1, wherein the instructions, when executed, further cause the processor to randomly select the current whole reel symbol based on the random number generated.

10. The gaming machine of claim 1, further comprising an input operable to monitor a credit input.

11. The gaming machine of claim 1, wherein the instructions, when executed, further cause the processor to select the current whole reel symbol and the plurality of symbols from a reel symbol set.

12. The gaming machine of claim 1, wherein the instructions, when executed, further cause the processor to select the current whole reel symbol from a whole reel symbol set, and the plurality of symbols from a reel symbol set.

13. The gaming machine of claim 12, wherein the whole reel symbol set is a subset of the reel symbol set.

14. The gaming machine of claim 12, wherein the instructions, when executed, further cause the processor to randomly select a second current whole reel symbol from the whole reel symbol set, in response to having selected the plurality of display positions in the first reel and the plurality of display positions in a second reel for displaying the current whole reel symbol and the second current whole reel symbol, respectively.

15. The gaming machine of claim 1, wherein the instructions, when executed, further cause the processor to trigger the series of whole reel symbol game rounds, in response to a winning combination occurring in a previous game round.

16. The gaming machine of claim 1, further comprising an input, and wherein the instructions, when executed, further cause the processor to trigger the series of whole reel symbol game rounds, in response to receiving an initiation at the input from a player.

17. The gaming machine of claim 1, further comprising an input, and wherein the instructions, when executed, further cause the processor to randomly select the first reel, in response to receiving an initiation at the input from a player.

18. The gaming machine of claim 1, further comprising an input, and wherein the instructions, when executed, further cause the processor to select the first reel, in response to a winning combination occurring in a previous game round.

19. A method for increasing winning in a series of whole reel symbol game rounds in a gaming system including a display device to display i) a plurality of reels, each of the plurality of reels having a plurality of display positions, and ii) a whole reel symbol window outside of the plurality of reels, a player-interface, and a controller having a processor and a memory, the memory storing a plurality of instructions, which, when executed, cause the processor to initiate the series of whole reel symbol game rounds, the method comprising:

initiating a current round in the series of whole reel symbol game rounds determined by the player-interface;

transmitting to the display device a current whole reel symbol for display in the whole reel symbol window;

replacing a different whole reel symbol at the plurality of display positions on a first reel from a previous round of the series of whole reel symbol game rounds with the current whole reel symbol;

spinning the plurality of reels, less the first reel, to show a plurality of symbols in the plurality of display positions selected randomly selected based on a random number generated by a random number generator; and forming on the display device an outcome for the current round in the series of whole reel symbol game rounds based on the plurality of symbols displayed.

20. A non-transitory computer-readable medium comprising a plurality of instructions, for conducting a series of whole reel symbol game rounds on a gaming system including a display device operable to provide i) a plurality of reels, each of the plurality of reels having a plurality of display positions, and ii) a whole reel symbol window outside of the plurality of reels, a player-interface, and a game controller, the plurality of instructions, which, when executed, cause one or more processors to perform the steps of:

receiving a current whole reel symbol in the whole reel symbol window for display at the display device responsive to an initiation of a current round in the series of whole reel symbol game rounds determined at the player-interface;

causing the display device to display a different whole reel symbol being reset at the plurality of display positions on a first reel from a previous round in the series of whole reel symbol game rounds with the current whole reel symbol;

causing the display device to display the plurality of reels, less the first reel, being spun, to display a plurality of symbols in the plurality of display positions in the plurality of reels, respectively, less the first reel, randomly selected based on a random number generated by a random number generator; and causing the display device to display an outcome for the current round in the series of whole reel symbol game rounds based on the plurality of symbols displayed.

* * * * *